Patented July 15, 1952

2,603,611

UNITED STATES PATENT OFFICE 2,603,611

STYRENATED OIL-TALL OIL VINYL ESTERS COATING COMPOSITIONS

Paul E. Marling, Dayton, Ohio, assignor to Monsanto Chemical Company, St. Louis, Mo., a corporation of Delaware No Drawing. Application October 25, 1948, Serial No. 56,469

10 Claims. (Cl. 260—23)

This invention relates to new and improved coating compositions readily prepared from inexpensive and abundantly available raw materials. More particularly the invention relates to self-drying, film-forming compositions prepared from alkenyl aromatic hydrocarbon modified drying oils and vinyl esters of tall oil.

The paint and varnish industry has been seeking to adapt styrene to coating composition use because of its low cost and general availability. Many of the developed coating compositions are too brittle for most applications, and others are only suitable for preparation of pigmented films because of the opacity resulting from the incompatibility of the styrenated oils with many commonly used resins and other coating composition components. It is also known that transparent drying oil substitutes can be prepared from styrene by interpolymerizing it with drying oils by specialized procedures. Compounds of this type are commercially available and known to the industry as "styrenated oils." Although for many purposes the available styrenated oils are suitable, there are numerous formulations involving mixtures with natural drying oils in varnishes where the incompatibility restricts the utility.

The primary purpose of this invention is to provide new transparent coating compositions from styrene and related monomers. A further purpose is to provide coatings of unusual resistance to thermo softening and to the action of organic solvents, water and alkali. A still further purpose of the invention is to provide a coating composition involving mixtures of alkenyl aromatic hydrocarbon modified drying oils with other self-drying coating compositions to develop specialized properties.

The alkenyl aromatic hydrocarbon modified drying oils are copolymers of a drying oil and a styrene type of monomer, such as styrene, α-methylstyrene, vinylbiphenyl and isopropenylbiphenyl, wherein the ethylenic bond of the alkenyl radical is conjugated with the double bonds of the benzene ring. Suitable oils are the drying oils or the semi-drying oils, including linseed oil, soy oil, tung oil, and dehydrated castor oil. The copolymers are prepared by polymerization at elevated temperatures, preferably in the presence of peroxide catalysts, such as benzoyl peroxide, acetyl peroxide, t-isobutylhydroperoxide, isopropyl percarbonate and homologues thereof, soluble in the mixed monomers or in the polymerization medium. The catalysts may be present to the extent of from 0.01 to 5 percent by weight, based on the combined monomers, but the preferred proportion of catalyst will depend upon the extent of polymerization required to bring the copolymer up to the desired viscosity at a predetermined temperature. The proportion of the monomers and the original viscosity of the drying oil being used will also influence the quantity of catalyst required to attain the desired viscosity. Generally from 25 to 75 percent by weight, of vinyl or isopropenyl aromatic derivative, and 75 to 25 percent drying oil will produce a beneficial result. Optimum properties will be secured by using the preferred proportion of 40 to 60 percent of either component.

The alkenyl aromatic hydrocarbon modified drying oils may be prepared by refluxing the drying oil with an inert solvent or diluent, such as xylene, benzene, toluene, dioxane, or petroleum ether, in the presence of an organic peroxide, and adding the vinyl (or isopropenyl) aromatic hydrocarbon gradually until a predetermined viscosity is achieved. The end-point viscosity being that which will yield a desired viscous liquid copolymer after evaporation of the inert solvent or diluent.

An alternative method of preparing the alkenyl aromatic hydrocarbon modified drying oil involves heating a mixture of the drying oil and the vinyl or isopropenyl aromatic hydrocarbon and heating them until the monomer is copolymerized to the desired extent as determined by the measured viscosity. Where an active monomer, such as styrene is used, from 5 to 40 percent of a less active monomer, such as an isopropenyl derivative should be included to retard polymerization.

In accordance with this invention it has been found that excellent coating compositions may be made by blending the alkenyl aromatic hydrocarbon modified drying oils with vinyl esters of tall oils. These vinyl esters are compounds well known to the art, and are prepared by the vinylation of tall oil acids by means of acetylene in the presence of certain heavy metal salt catalysts, such as mercury, zinc and cadmium salts. These esters are known to be capable of polymerization in the manner similar to other vinyl esters. The tall oil vinyl esters are mixtures of the vinyl esters of aliphatic monocarboxylic acids having from eight to eighteen carbon atoms.

In the preferred practice of this invention from 10 to 75 percent of the vinyl esters of tall oil is blended with from 25 to 90 percent of the alkenyl aromatic hydrocarbon modified drying oil and with sufficient solvent as required by the particular means of application to be used. Suitable solvents for thinning the coating compositions are turpentine, mineral spirits, xylene, toluene and benzene. The vinyl esters of tall oil are generally blended with the alkenyl aromatic hydrocarbon modified drying oil in the desired proportions. If desirable, the mixing may be facilitated by thinning the alkenyl aromatic hydrocarbon modified drying oil with a suitable solvent, such as the above mentioned solvents for the mixtures, prior to the addition of the vinyl esters.

Although the invention is particularly directed to the preparation of transparent films, conventional paint formulations may be used involving pigments, driers, and other additives. The coating compositions, especially when driers are incorporated may be effectively dried at room temperatures. Coating compositions may also be prepared by drying under the influence of infrared lamps if desired, or they may be baked in a suitable oven at elevated temperatures from 100° F. to 400° F.

Further details of the preparation and use of the new coating compositions are set forth with respect to the following specific examples.

EXAMPLE 1

Vinyl esters of tall oil

Six hundred parts by weight of purified tall oil and 5.4 parts of zinc acetate

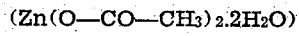

$(Zn(O-CO-CH_3)_2 \cdot 2H_2O)$ were heated to a temperature of 194–196° C. While vigorously stirring the mixture, a stream of acetylene was passed through for thirty-six hours at which time the reaction mass was found to have an acid number of fourteen. The product was then cooled and used in the following coating composition formulations.

EXAMPLE 2

Styrenated oil

A mixture of 63 parts by weight of styrene, 27 parts of α-methylstyrene and 2.7 parts of benzoyl peroxide were mixed with stirring until a clear solution resulted. This mixture was gradually introduced over a two hour period into a glass reactor containing 60 parts by weight of dehydrated castor oil (viscosity F–G). After the reagents had been combined the temperature was raised to 480° F. and maintained for three and one-half hours. The resulting product was a clear, transparent viscous material free of the characteristic monomeric styrene odor. A clear varnish was prepared by adding 50 parts by weight of petroleum spirits.

EXAMPLE 3

Coating compositions

Vinyl esters of tall oil were blended in various proportions with a petroleum spirit solution of styrenated oil (70 percent solids). Steel panels were coated with the compositions and baked one and one-half hours at 250° F. The observed properties of the films are set forth in the following table.

| Styrenated Oil Solids Parts by Weight | Vinyl Esters of tall oil Parts by Weight | Properties of Film |
|---|---|---|
| 14 | 0 | Clear, Hard. |
| 14 | 2 | Do. |
| 14 | 4 | Do. |
| 14 | 14 | Clear, Flexible. |
| 14 | 34 | Clear, Very Flexible. |
| 14 | 54 | Clear, Moderately Soft. |
| 0 | 100 | Clear, Very Soft. |

Compositions containing in excess of 75 percent of the vinyl esters were found to be soft, however clear, transparent films were obtained. The styrenated oil has very poor compatibility for drying oils, alkyd resins and other conventional varnish components, however blends of the styrenated oil and vinyl esters of tall oil have excellent compatibility.

To demonstrate the differences in compatibility, coating compositions were prepared from various proportions of styrenated oil and soy oil and the following table demonstrates the quite different physical properties observed:

| Styrenated Oil Parts by Weight of Solids | Soy Oil Parts by Weight | Properties of Films |
|---|---|---|
| 14 | 7 | Moderately Soft and Opaque. |
| 14 | 14 | Soft and Opaque. |
| 14 | 28 | Do. |

EXAMPLE 4

To demonstrate the air drying properties of the new coating composition, additional experiments were conducted by preparing various mixtures of vinyl esters of tall oil and the styrenated oil with cobalt naphthenate drier (0.025 percent cobalt on solids content). Wood panels coated with the compositions were permitted to dry in contact with the air and periodic inspections made to determine the progress of the drying. The following table sets forth the various compositions and the differences in their drying properties.

| Styrenated Oils Parts by Weight of Solids | Vinyl Esters of Tall Oil Parts by Weight | Time to Dry Dust Free | Remarks |
|---|---|---|---|
| | | hours | |
| 11 | 0 | 1 | Clear. |
| 11 | 2 | 1 | Do. |
| 11 | 5 | 2 | Do. |
| 11 | 11 | 4 | Do. |
| 11 | 22 | 18 | Do. |

The above data demonstrate that compatible films are produced in all proportions from mixtures of styrenated oil and vinyl esters of tall oil. A control using one hundred percent vinyl esters of tall oil was made but the film was not dried satisfactorily in twenty-four hours.

To demonstrate the difference in properties, blended varnishes of various proportions of styrenated oil and soy oil with cobalt naphthenate drier were made under identical conditions. The properties of the films were observed and set forth in the following table.

| Styrenated Oils Parts by Weight of Solids | Soy Oil Parts by Weight | Time to Dry Dust Free | Remarks |
|---|---|---|---|
| | | hours | |
| 4 | 0 | 1 | Clear. |
| 4 | 1 | 7 | Cloudy. |
| 4 | 2 | 24 | Opaque. |
| 4 | 4 | 30 | Do. |

The invention is defined by the following claims.

I claim:

1. A coating composition comprising (A) 25 to 90 percent by weight of a copolymer of 25 to 75 percent by weight of a fatty acid-containing natural drying oil and 75 to 25 percent by weight of a monomer of the group consisting of styrene, vinylbiphenyl, isopropenylbiphenyl, α-methylstyrene and mixtures thereof, and (B) 10 to 75 percent by weight of a mixture of the vinyl esters of tall oil acids.

2. An article comprising a structure having superposed thereon a coating comprising a film of a blend of (A) from 25 to 90 percent by weight of a copolymer of 25 to 75 percent by weight of a fatty acid-containing natural drying oil and 75 to 25 percent by weight of a monomer of the group consisting of styrene, vinylbiphenyl, isopropenylbiphenyl, α-methylstyrene and mixtures thereof, and (B) 10 to 75 percent by weight of a mixture of the vinyl esters of tall oil acids.

3. A coating composition comprising (A) 25 to 90 percent of a copolymer of 25 to 75 percent of a fatty acid-containing natural drying oil and 75 to 25 percent of styrene and (B) 10 to 75 percent of a mixture of the vinyl esters of tall oil acids, all percents being by weight.

4. A coating composition comprising (A) 25 to 90 percent of a copolymer of 25 to 75 percent of a fatty acid-containing natural drying oil and 75 to 25 percent of α-methylstyrene and (B) 10 to 75 percent of a mixture of the vinyl esters of tall oil acids, all percents being by weight.

5. An article comprising a structure having superposed thereon a coating comprising a film of a blend of (A) from 25 to 90 percent of a copolymer of 25 to 75 percent of a fatty acid-containing natural drying oil and 75 to 25 percent styrene and (B) 10 to 75 percent of a mixture of the vinyl esters of tall oil acids, all percents being by weight.

6. An article comprising a structure having superposed thereon a coating comprising a film of a blend of (A) from 25 to 90 percent of a copolymer of 25 to 75 percent of a fatty acid-containing natural drying oil and 75 to 25 percent α-methylstyrene and (B) 10 to 75 percent of a mixture of the vinyl esters of tall oil acids, all percents being by weight.

7. A coating composition comprising (A) 25 to 90 percent of a copolymer of 40 to 60 percent of a fatty acid-containing natural drying oil and 60 to 40 percent of styrene and (B) 10 to 75 percent of a mixture of the vinyl esters of tall oil acids, all percents being by weight.

8. A coating composition comprising (A) 25 to 90 percent of a copolymer of 40 to 60 percent of a fatty acid-containing natural drying oil and 60 to 40 percent of α-methylstyrene and (B) 10 to 75 percent of a mixture of the vinyl esters of tall oil acids, all percents being by weight.

9. An article comprising a structure having superposed thereon a coating comprising a film of a blend of (A) from 25 to 90 percent of a copolymer of 40 to 60 percent of a fatty acid-containing natural drying oil and 60 to 40 percent styrene and (B) 10 to 75 percent of a mixture of the vinyl esters of tall oil acids, all percents being by weight.

10. An article comprising a structure having superposed thereon a coating comprising a film of a blend of (A) from 25 to 90 percent of a copolymer of 40 to 60 percent of a fatty acid-containing natural drying oil and 60 to 40 percent α-methylstyrene and (B) 10 to 75 percent of a mixture of the vinyl esters of tall oil acids, all percents being by weight.

PAUL E. MARLING.

REFERENCES CITED

The following references are of record in the file of this patent:

UNITED STATES PATENTS 2,228,365    Reepe et al. -------- Jan. 14, 1941

OTHER REFERENCES

Peterson, "Styrenated Oils," article in "Official Digest," August 1948, pages 596–600.